United States Patent
Belleville et al.

(10) Patent No.: US 9,322,341 B2
(45) Date of Patent: Apr. 26, 2016

(54) SYSTEM AND METHOD FOR ENGINE TRANSIENT POWER RESPONSE

(71) Applicant: PRATT & WHITNEY CANADA CORP., Longueuil (CA)

(72) Inventors: François Belleville, Varennes (CA); Philippe Beauchesne-Martel, Brossard (CA); Keith Morgan, Westmount (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 365 days.

(21) Appl. No.: 13/796,624

(22) Filed: Mar. 12, 2013

(65) Prior Publication Data
US 2014/0278014 A1 Sep. 18, 2014

(51) Int. Cl.
*F02D 29/02* (2006.01)
*F02C 9/54* (2006.01)

(52) U.S. Cl.
CPC .. *F02D 29/02* (2013.01); *F02C 9/54* (2013.01)

(58) Field of Classification Search
CPC ............. F02C 9/28; F02C 9/54; F02C 7/057; F02C 9/20; F02C 3/107; F02D 41/0007; F02D 41/009; F02D 19/0634; F02D 41/04; F02D 41/1448; F02D 41/18; F02D 41/2422; F02D 15/00; F02D 2250/21; F02D 41/0002; Y02T 10/144; F02K 1/17; F02K 1/16; F02M 25/0707; F02M 25/0711; F02M 25/0713; F05D 2270/023; F05D 2270/051; F05D 2270/44; F05D 2270/04; F05D 2270/053; F01D 17/162; F04D 27/0246; B64C 27/14
USPC ......................................................... 701/110
See application file for complete search history.

(56) References Cited

U.S. PATENT DOCUMENTS

| | | | | | |
|---|---|---|---|---|---|
| 3,579,992 | A | * | 5/1971 | Urban | F02K 1/17 60/239 |
| 3,686,860 | A | * | 8/1972 | White | F02C 9/54 60/39.25 |
| 3,777,479 | A | * | 12/1973 | Hagen | F02C 9/54 60/235 |
| 3,854,287 | A | * | 12/1974 | Rembold | B64D 31/14 60/236 |
| 3,932,058 | A | * | 1/1976 | Harner | F02K 1/66 415/148 |

(Continued)

OTHER PUBLICATIONS

Chomdej, "Elaboration of a robust thermodynamic model of aircraft engine", Kasetsart University, Bangkok, Thailand, Paper for the 21st Conference of Mechanical Engineering Network of Thailand, AME-11, 2007, pp. 461-468.

(Continued)

*Primary Examiner* — Lindsay Low
*Assistant Examiner* — John Bailey
(74) *Attorney, Agent, or Firm* — Norton Rose Fulbright Canada LLP

(57) ABSTRACT

There is provided a system and method for controlling an engine. A request signal indicative of a demand for the engine to output a required power level is first receive. A position control signal is then generated in response to the request signal. The position request signal is indicative of a first request for adjusting a present position of a variable geometry mechanism of the engine towards a commanded position to achieve the required power level. An acceleration rate control signal is further generated on the basis of the position control signal. The acceleration rate control signal is indicative of a second request for adjusting an acceleration rate of the engine in accordance with the commanded position of the variable geometry mechanism. The position control signal and the acceleration rate control signal are then output to the engine.

18 Claims, 7 Drawing Sheets

(56) References Cited

U.S. PATENT DOCUMENTS

| | | | | |
|---|---|---|---|---|
| 3,963,372 A * | 6/1976 | McLain | B64C 27/14 | 416/27 |
| 4,232,515 A * | 11/1980 | Brown | F02C 9/54 | 244/46 |
| 4,593,523 A * | 6/1986 | Hawes | F02C 9/28 | 60/39.281 |
| 4,809,500 A * | 3/1989 | Roberts, Jr. | F02C 9/28 | 60/235 |
| 4,928,482 A * | 5/1990 | Pollak | F02C 9/28 | 60/39.27 |
| 4,947,643 A * | 8/1990 | Pollak | F02C 9/28 | 60/236 |
| 4,984,425 A * | 1/1991 | Smith | F02C 9/28 | 60/39.181 |
| 5,042,245 A * | 8/1991 | Zickwolf, Jr. | F04D 27/0246 | 60/773 |
| 5,235,801 A * | 8/1993 | Evenson | F02C 6/00 | 415/26 |
| 5,277,024 A * | 1/1994 | Bissey | F02C 9/28 | 60/39.281 |
| 5,357,748 A | 10/1994 | Khalid | | |
| 5,560,208 A * | 10/1996 | Halimi | F02B 37/025 | 60/600 |
| 5,896,736 A | 4/1999 | Rajamani | | |
| 6,205,771 B1 | 3/2001 | Rowe | | |
| 6,289,274 B1 * | 9/2001 | Martucci | F02C 7/22 | 60/773 |
| 6,637,205 B1 * | 10/2003 | Ahmad | F02B 37/04 | 60/607 |
| 6,758,044 B2 | 7/2004 | Mannarino | | |
| 7,237,382 B2 * | 7/2007 | Muramatsu | F02C 9/28 | 60/39.281 |
| 7,246,495 B2 * | 7/2007 | Muramatsu | F02C 9/28 | 60/39.281 |
| 7,269,953 B2 | 9/2007 | Gadde et al. | | |
| 7,293,415 B2 | 11/2007 | Hoffman et al. | | |
| 7,762,084 B2 * | 7/2010 | Martis | F01D 15/10 | 60/39.091 |
| 8,220,245 B1 * | 7/2012 | Papandreas | F02C 3/10 | 60/39.163 |
| 8,459,038 B1 * | 6/2013 | Lickfold | | 60/772 |
| 9,002,615 B2 * | 4/2015 | Kumar | F02C 9/28 | 385/12 |
| 2003/0074884 A1 * | 4/2003 | Snow | F02C 7/236 | 60/204 |
| 2006/0101826 A1 * | 5/2006 | Martis | F01D 15/10 | 60/794 |
| 2008/0053091 A1 * | 3/2008 | Barthelet | F02B 37/10 | 60/608 |
| 2008/0264067 A1 * | 10/2008 | Flucker | F01D 17/162 | 60/793 |
| 2010/0281875 A1 * | 11/2010 | Price | F01D 17/162 | 60/772 |
| 2011/0048046 A1 * | 3/2011 | Sommer | F04D 17/12 | 62/228.1 |
| 2011/0054704 A1 * | 3/2011 | Karpman | F02C 9/28 | 700/282 |
| 2011/0073069 A1 * | 3/2011 | Marriott | F02P 5/1508 | 123/406.12 |
| 2011/0276256 A1 * | 11/2011 | Kociba | F02D 29/02 | 701/110 |
| 2011/0288731 A1 | 11/2011 | Minto et al. | | |

OTHER PUBLICATIONS

Uchida, "Transient performance prediction for turbocharging systems incorporating variable-geometry turbochargers", Special Issue Turbocharging Technologies, R&D Review of Toyota CRDL, vol. 41, No. 3, 2006, pp. 22-28.

Roodsary et al., "Software for fuel schedule selection and transient behaviour of marine gas turbine", Institute of Armament Technology, Girinagar, Bangladesh, Def Sci J, vol. 41, No. 1, Jan. 1991, pp. 45-58.

Norman et al., "Improving aircraft engine operability through electric system design and operation" Abstract, University of Strathclyde, United Kingdom, Power Electronics, Machines and Drives (PEMD 2010), 5th IET International Conference, 2010. (IEEEXPLORE).

McCardle et al. "Dynamic and transient performance of turbofan/turboshaft convertible engine with variable inlet guides vanes", Abstract, Journal Article, NTRS, 1996. (RESEARCHGATE).

* cited by examiner

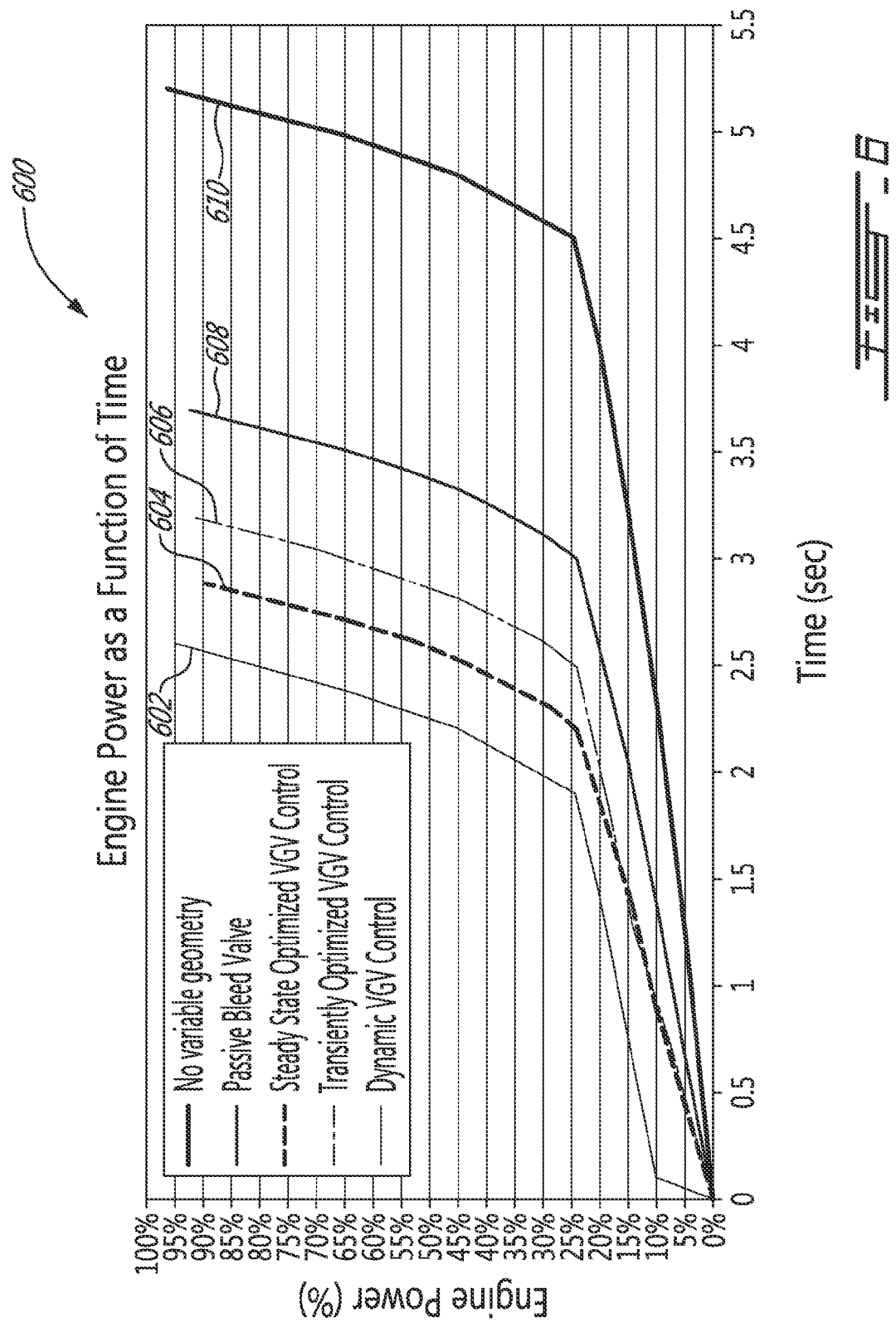

SYSTEM AND METHOD FOR ENGINE TRANSIENT POWER RESPONSE

TECHNICAL FIELD

The application relates generally to the control of gas turbine engines, and more particularly to controlling transient aspects thereof.

BACKGROUND OF THE ART

During aircraft operations consisting of rapid engine transitions from low to high power levels, it is desirable to reduce the response time of the engine in order to achieve a required power. For this purpose, inlet mass flow can be increased by accelerating the gas generator of the engine, thereby increasing the engine's power. This may be achieved by a variety of techniques. For instance, a bleed valve may be actuated either actively or passively. However, active actuation of the bleed valve adds weight to the engine while passive actuation increases the gas path temperature and decreases the gas generator speed of the engine. The running line of the engine can alternatively be lowered to improve transient engine performance. This may however result in a decrease in the overall efficiency, an increase in specific fuel consumption, and maximum required operating gas generator speed of the engine while increasing the overall operating temperature thereof. Although casing treatment may also be used, this technique may lower the efficiency of the engine.

There is therefore a need for an improved method for controlling the transient power response of an engine.

SUMMARY

In one aspect, there is provided a system for controlling an engine, the system comprising a receiving unit adapted to receive a request signal indicative of a demand for the engine to output a required power level; and a processing unit adapted to generate in response to the request signal a position control signal indicative of a first request for adjusting a present position of a variable geometry mechanism of the engine towards a commanded position to achieve the required power level, generate on the basis of the position control signal an acceleration rate control signal indicative of a second request for adjusting an acceleration rate of the engine in accordance with the commanded position of the variable geometry mechanism, and output the position control signal and the acceleration rate control signal to the engine.

In another aspect, there is provided a method for controlling an engine, the method comprising receiving a request signal indicative of a demand for the engine to output a required power level; generating in response to the request signal a position control signal indicative of a first request for adjusting a present position of a variable geometry mechanism of the engine towards a commanded position to achieve the required power level; generating on the basis of the position control signal an acceleration rate control signal indicative of a second request for adjusting an acceleration rate of the engine in accordance with the commanded position of the variable geometry mechanism; and outputting the position control signal and the acceleration rate control signal to the engine.

In a further aspect, there is provided a system for controlling an engine, the system comprising means for receiving a request signal indicative of a demand for the engine to output a required power level; means for generating in response to the request signal a position control signal indicative of a first request for adjusting a present position of a variable geometry mechanism of the engine towards a commanded position to achieve the required power level; means for generating on the basis of the position control signal an acceleration rate control signal indicative of a second request for adjusting an acceleration rate of the engine in accordance with the commanded position of the variable geometry mechanism; and means for outputting the position control signal and the acceleration rate control signal to the engine.

DESCRIPTION OF THE DRAWINGS

Reference is now made to the accompanying figures in which:

FIG. 6 illustrates a plot of the power of an engine as a function of time when various techniques are used to optimize the engine's transient response.

DETAILED DESCRIPTION

Figure 1:
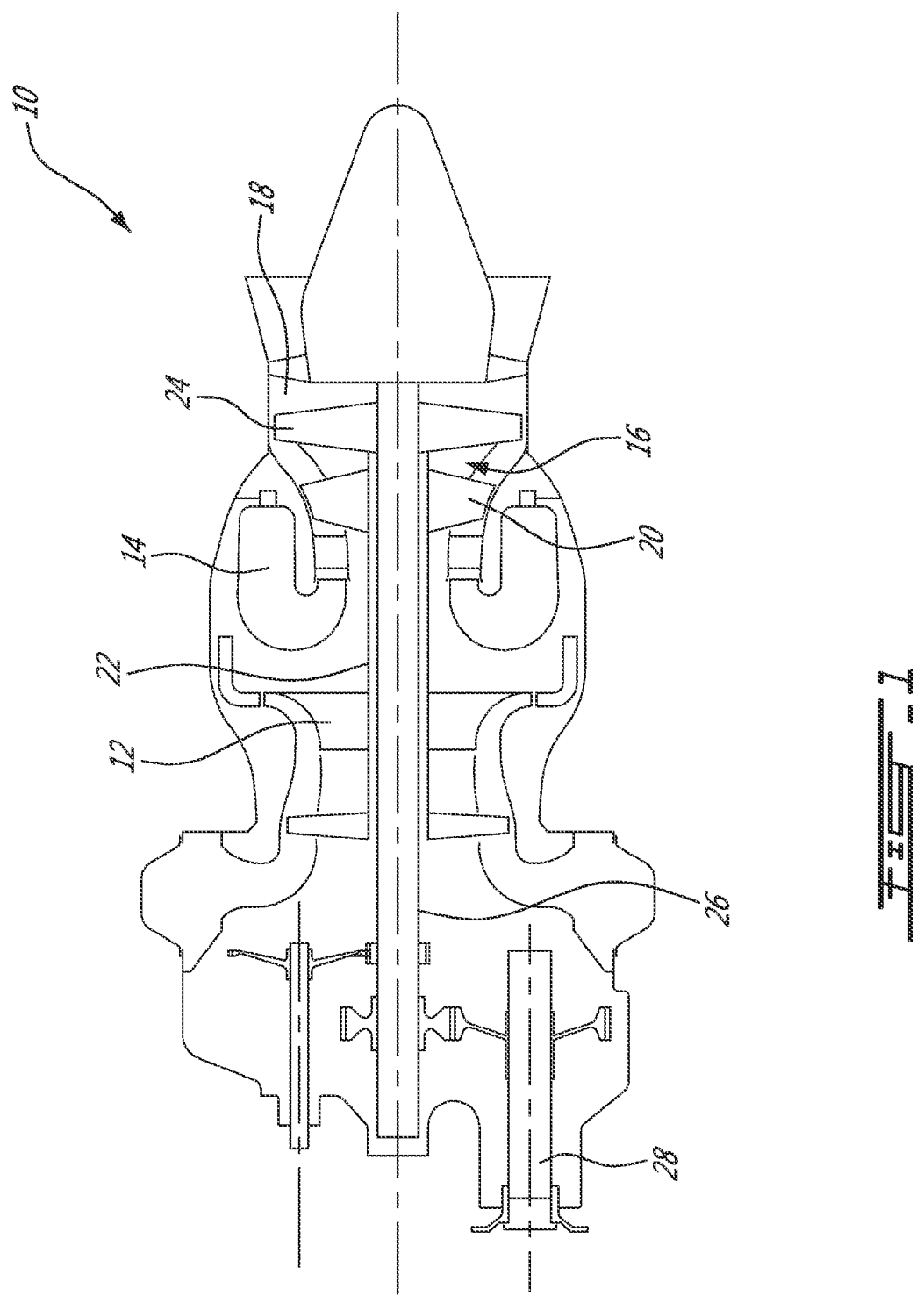
FIG. 1 is a schematic cross-sectional view of a gas turbine engine.

FIG. 1 illustrates a gas turbine engine 10 of a type preferably provided for use in subsonic flight, generally comprising in serial flow communication, a compressor section 12 for pressurizing the air, a combustor 14 in which the compressed air is mixed with fuel and ignited for generating an annular stream of hot combustion gases, and a turbine section 16 for extracting energy from the combustion gases. The combustion gases flowing out of the combustor 14 circulate through the turbine section 16 and are expelled through an exhaust duct 18. The turbine section 16 includes a compressor turbine 20 in driving engagement with the compressor section 12 through a high pressure shaft 22, and a power turbine 24 in driving engagement with a power shaft 26. The power shaft 26 is in driving engagement with an output shaft 28 through a reduction gearbox (not shown).

Although illustrated as a turboshaft engine, the gas turbine engine 10 may alternatively be another type of engine, for example a turbofan engine, also generally comprising in serial flow communication a compressor section, a combustor, and a turbine section, and a fan through which ambient air is propelled. A turboprop engine may also apply. In addition, although the engine 10 is described herein for flight applications, it should be understood that other uses, such as industrial or the like, may apply.

Figure 2:
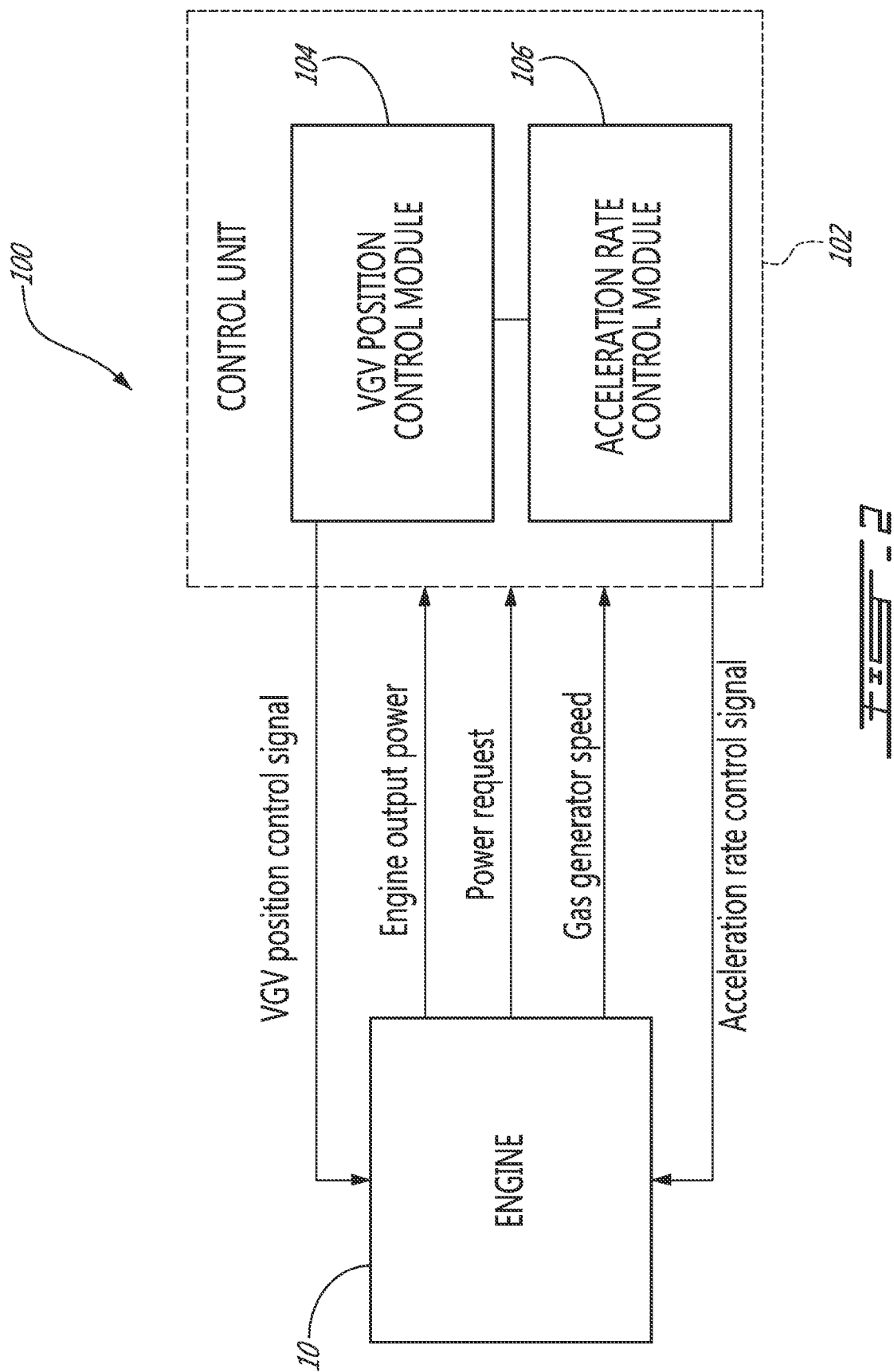
FIG. 2 is a schematic diagram of a system for controlling the engine of FIG. 1 for transient power response, in accordance with an illustrative embodiment.

Referring to FIG. 2, a system 100 for controlling the engine 10, particularly a variable geometry mechanism (not shown) thereof, to achieve optimized engine transient response will now be described. The variable geometry mechanism illustratively consists of variable guide vanes (VGVs), which may be one of inlet compressor guide vanes for directing air into the compressor section 12, outlet guide vanes for directing air out of the compressor section 12, variable stator vanes for directing incoming air into rotor blades (not shown) of the engine 10, variable nozzles, and the like. It should be understood that the system 100 may be used to adjust one or more of the above-mentioned VGVs for the purpose of decreasing the response time of the engine 10 during rapid engine transitions, e.g. from low to high power levels. Indeed, adjustment of the position (e.g. the angle) of the VGVs can impact the inlet mass flow to the engine 10, and in turn allow the engine 10 to operate at a required power.

The system 100 illustratively comprises a control unit 102, which is coupled to the engine 10 and illustratively includes a VGV position control module 104 and an acceleration rate control module 106. The control unit 102 may comprise a digital computer or Engine Control Unit (ECU) (not shown) using a Central Processing Unit (CPU) (not shown).

The VGV position control module 104 illustratively outputs a VGV position control signal to enable dynamic auto-scheduling of the VGVs. The position of the VGVs can be dynamically varied between a steady state schedule and a transient schedule. The steady state schedule provides optimum response and performance of the engine 10 when the latter operates at a low power level. As will be discussed further below, in the steady state schedule, the VGV position control module 104 adjusts the position of the VGVs so that the gas generator (or rotor) speed (NG) of the engine 10 is maximized. In particular, by moving the VGVs to more closed settings, the inlet mass flow of the engine 10 and the efficiency of the compressor section 12 can be minimized. As a result, the gas generator speed of the engine 10 is increased.

The transient schedule provides optimum engine response and performance when the engine 10 operates at a high power level. In the transient schedule, the VGV position control module 104 predictively optimizes the engine's output power. For this purpose, the VGVs may be moved to more open settings until they reach a position that optimizes fuel consumption by the engine 10. Higher power levels can therefore be achieved. In one embodiment, the VGV position control module 104 dynamically adjusts the position of the VGVs from the steady state schedule towards the transient schedule proportionally to the required engine power. For instance, the more the system 100 senses a deficit in power (whether actual or upcoming), the more the VGV position control module 104 adjusts the position of the VGVs towards the transient schedule. The VGV position control module 104 may thus constantly modulate the position of the VGVs between the steady state and transient schedules in accordance with the difference between the actual power presently output by the engine 10 and the required power.

Still referring to FIG. 2 and as will be discussed further below, the acceleration rate control module 106 illustratively outputs an acceleration rate control signal to modulate the maximum allowed acceleration reference of the engine 10 according to the VGV position. In this manner, the acceleration capability of the engine 10 can be dynamically modified in accordance with the position of the VGVs, as adjusted in response to the VGV position control signal from the VGV position control module 104. The achievable change in the engine's acceleration rate may depend on the surge margin of the engine 10. In one embodiment, the acceleration rate control module 106 increases the engine's acceleration rate as the position of the VGVs is adjusted towards more open settings in the transient schedule. In particular, the more the VGVs are opened as commanded by the VGV position control signal, the more the maximum allowed acceleration reference of the engine 10 is increased as commanded by the acceleration rate control signal, thereby allowing greater engine acceleration.

Figure 3A:
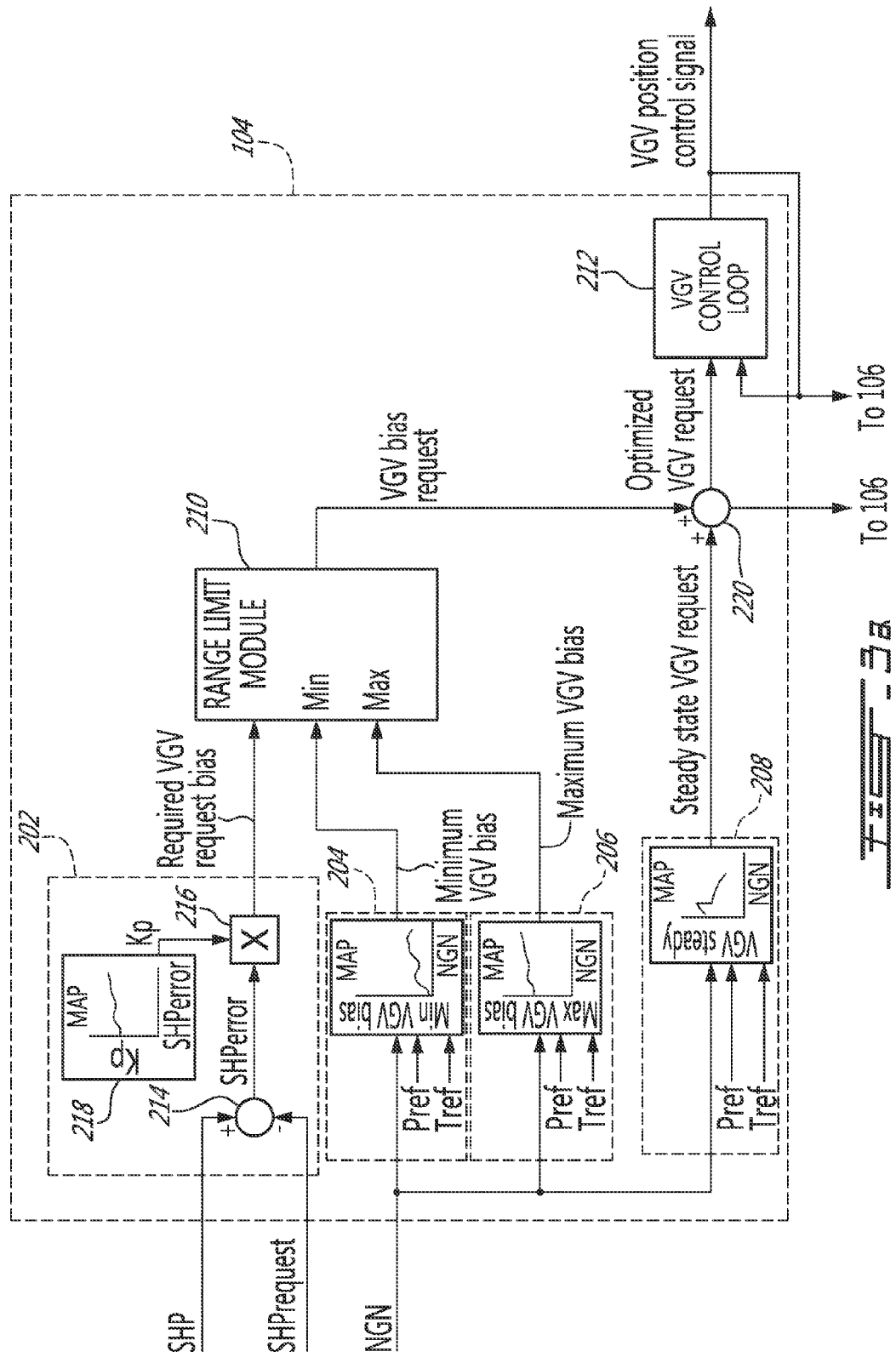
FIG. 3a is a schematic diagram of the VGV position control module of FIG. 2.

Referring now to FIG. 3a in addition to FIG. 2, the VGV position control module 104 illustratively comprises a required VGV request bias computation module 202, a minimum VGV bias computation module 204, a maximum VGV bias computation module 206, a steady state VGV request computation module 208, a range limit module 210, and a VGV control loop 212.

The control unit 102 illustratively receives at a receiving unit thereof (not shown) a measurement of the shaft horse power (SHP), i.e. the output power, of the engine 10 as well as a request for a required shaft horse power (SHPrequest). The required shaft horse power may be calculated by the engine's power governor (not shown). Although the engine's power is described herein as being measured using shaft horse power, it should be understood that other engine parameters may be used. For instance, the engine's spool speed (e.g. from the power turbine 24, compressor turbine 20, or the like), the engine's fuel flow, or the engine's thrust may apply. The request may indicate that a power level higher than the actual power level output by the engine 10 is needed. It should however be understood that the request may also indicate that a lower power level is needed.

The measurement of the engine's output power and the power request are then sent to the required VGV request bias computation module 202, which computes therefrom the adjustment or bias in VGV position that is to be requested to achieve the required power. For this purpose, the VGV request bias computation module 202 first computes at a difference operator 214 the difference (SHPerror) between the engine's output power level and the required power level indicated in the power request. The error is then multiplied by a proportional gain (Kp) at a multiplier 216 in order for the position of the VGV to ultimately be adjusted proportionally to the power requirement. The gain is computed by a gain controller 218, which may use a predetermined map, curve, table, or the like (not shown) retrieved from memory (not shown). It should be understood that although a map is described herein for illustrative purposes, algorithms or other logic, such as polynomial equations or full proportional-integral-derivative (PID) controllers, may also be used.

The map may represent the gain (Kp) as a function of the difference between the engine's output power and the required power. The map may be established for a reference pressure (Pref) and temperature (Tref) at the inlet of the engine 10. It should be understood that the pressure and temperature reference may be obtained anywhere in the engien's compressor section 12, from the inlet to the diffuser (not shown). Upon receiving the difference value output by the difference operator 214, the gain controller 218 retrieves from the map the corresponding value of the gain. The multiplier 216 then outputs a signal comprising the required VGV request bias and this bias is sent to the range limit module 210.

The range limit module 210 further receives a minimum VGV bias value from the minimum VGV bias computation module 204 and a maximum VGV bias value from the maximum VGV bias computation module 206. The minimum VGV bias is illustratively representative of the minimum allowable value for the adjustment or bias in the VGVs' position while the maximum VGV bias is representative of the maximum allowable value for the VGVs' position bias. These values are computed on the basis of the corrected gas generator speed (NGN) value, which may be computed from the gas generator speed (NG) received at the receiving unit (not shown) of the control unit 102 as follows:

$$NGN = NG/\sqrt{(T/T_{standard})} \qquad (1)$$

where T is the engine's temperature and $T_{standard}$ is the standard sea level temperature.

The NGN value is then used by the minimum VGV bias computation module 204 and the maximum VGV bias computation module 206 to respectively output the minimum value of the VGV bias and the maximum value of the VGV bias. For this purpose, each one of the modules 204, 206, and 208 determines its output from a map retrieved from the memory. For instance, the minimum VGV bias computation module 204 may use a map of the minimum VGV bias as a function of the corrected gas generator speed (NGN) at the reference pressure and temperature. Upon receiving the NGN value, the minimum VGV bias computation module 204 may then retrieve from the map the corresponding minimum VGV bias value. Similarly, the maximum VGV bias computation module 206 may use a map of the maximum VGV bias as a function of the corrected gas generator speed (NGN) at the reference pressure and temperature. Upon receiving the NGN value, the maximum VGV bias computation module 206 may then retrieve from the map the corresponding maximum VGV bias value.

The range limit module 210 may then process the received required VGV request bias, minimum VGV bias, and maximum VGV bias to output the VGV bias request. Similarly to the required VGV request bias, the VGV bias request is indicative of the bias in VGV position that is requested to achieve the required power. However, the value of the VGV bias request is comprised within the specified minimum and maximum VGV bias limits. Indeed, the range limit module 210 bounds the output it generates within known or specified minimum and maximum values. In the present case, the range limit module 210 bounds the VGV bias request between the minimum VGV bias output by the minimum VGV bias computation module 204 and the maximum VGV bias value output by the maximum VGV bias computation module 206. In one embodiment, the range limit module 210 bounds the VGV bias request between 0 and 20. In other embodiments, the range limit module 210 may limit the VGV bias request from −100% to 100% of the full range of the VGVs' actuator system.

The VGV bias request is further summed at a summing junction 220 with a steady state VGV request received from the steady state VGV request computation module 208. The steady state VGV request is illustratively representative of the VGV position to be achieved in the steady state schedule. The steady state VGV request may be obtained by the steady state VGV request computation module 208 using a map of the steady state VGV request as a function of the NGN value at the reference pressure and temperature.

The summing junction 220 then outputs an optimized VGV request, which is indicative of the request to transition, proportionally to the power request, the position of the VGVs from the optimum steady state position, as indicated in the steady state VGV request, towards the optimum transient position. The optimized VGV request is then sent to the VGV control loop 212, which accordingly outputs the VGV position control signal. The VGV control signal is indicative of the VGV position commanded from the control unit 102 and is sent to the engine 10 for adjusting the position of the VGVs accordingly. The VGV control signal is also fed back to the VGV control loop 212 for closed loop control of the position of the VGVs. As will be discussed further below with reference to FIG. 3b, both the optimized VGV request and the VGV position control signal are also sent to the acceleration rate control module 106 to enable the latter to compute the desired acceleration adjustment corresponding to the adjustment in VGV position.

In one embodiment, if the change in the engine's output power is no longer required, e.g. a corresponding maneuver having generated the power request is aborted, the VGV position control module 104 generates the VGV position control signal to command the VGVs to automatically return towards the steady state schedule. As such, the change in engine output power is promptly limited.

Figure 3B:
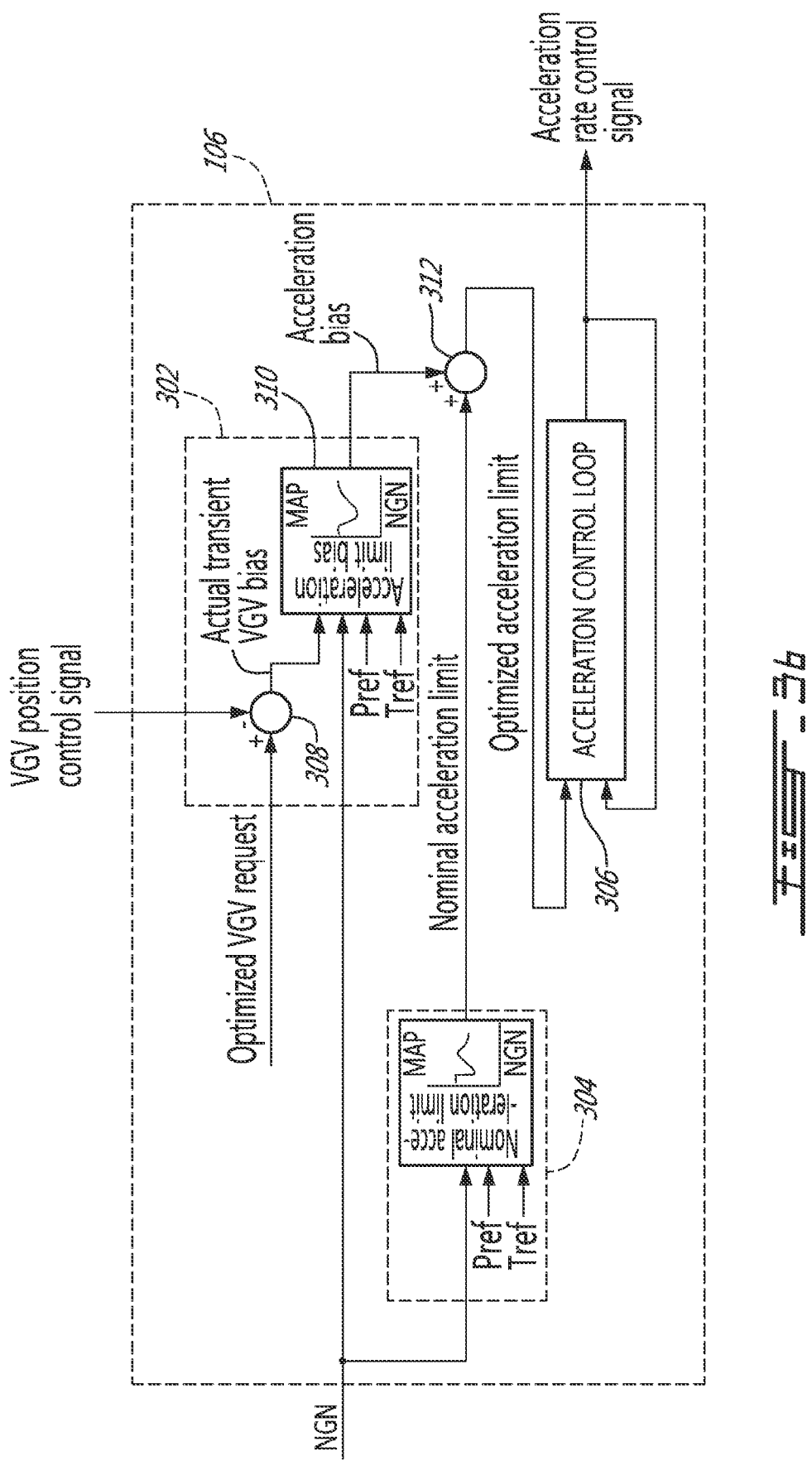
FIG. 3b is a schematic diagram of the acceleration rate control module of FIG. 2.

Referring now to FIG. 3b in addition to FIG. 2, the acceleration rate control module 106 illustratively comprises an acceleration bias computation module 302, a nominal acceleration limit computation module 304, and an acceleration control loop 306. The optimized VGV request and the VGV position control signal are received from the VGV position control module 104 at the acceleration bias computation module 302. The difference between the optimized VGV request and the VGV position control signal is then computed at a difference operator 308 to output the actual transient VGV bias. The actual transient VGV bias is then compared to an acceleration limit bias to generate the acceleration bias, which is representative of the adjustment in the engine's acceleration rate desired to comply with the adjustment in the VGVs' position. The acceleration limit bias, i.e. the maximum allowable acceleration limit, may be obtained using a characterizing block 310. For this purpose, the NGN value may be input into the characterizing block 310, which uses a map of the acceleration limit bias as a function of the corrected gas generator speed (NGN) at the reference pressure and temperature. Comparison with the acceleration limit bias determined by the characterizing block 310 may be used to ensure that the acceleration bias output by the acceleration bias computation module 302 remains within acceptable limits.

The acceleration bias is then added at a summing junction 312 to a nominal acceleration limit in order to output an optimized acceleration limit, which is representative of a request to transition from the nominal engine acceleration rate to the acceleration rate that is optimum given the commanded VGV position adjustment. The nominal acceleration limit is illustratively generated by the nominal acceleration limit computation module 304 using a map of the nominal acceleration limit as a function of the NGN value at the reference pressure and temperature. The optimized acceleration limit is then sent to the acceleration control loop 306, which generates therefrom the acceleration rate control signal. This signal is then sent to the engine 10 to modify the acceleration limit thereof and enable engine operation at the modified acceleration rate. The acceleration rate control signal is further fed back to the acceleration control loop for closed loop control of the engine's acceleration rate.

Figure 4:
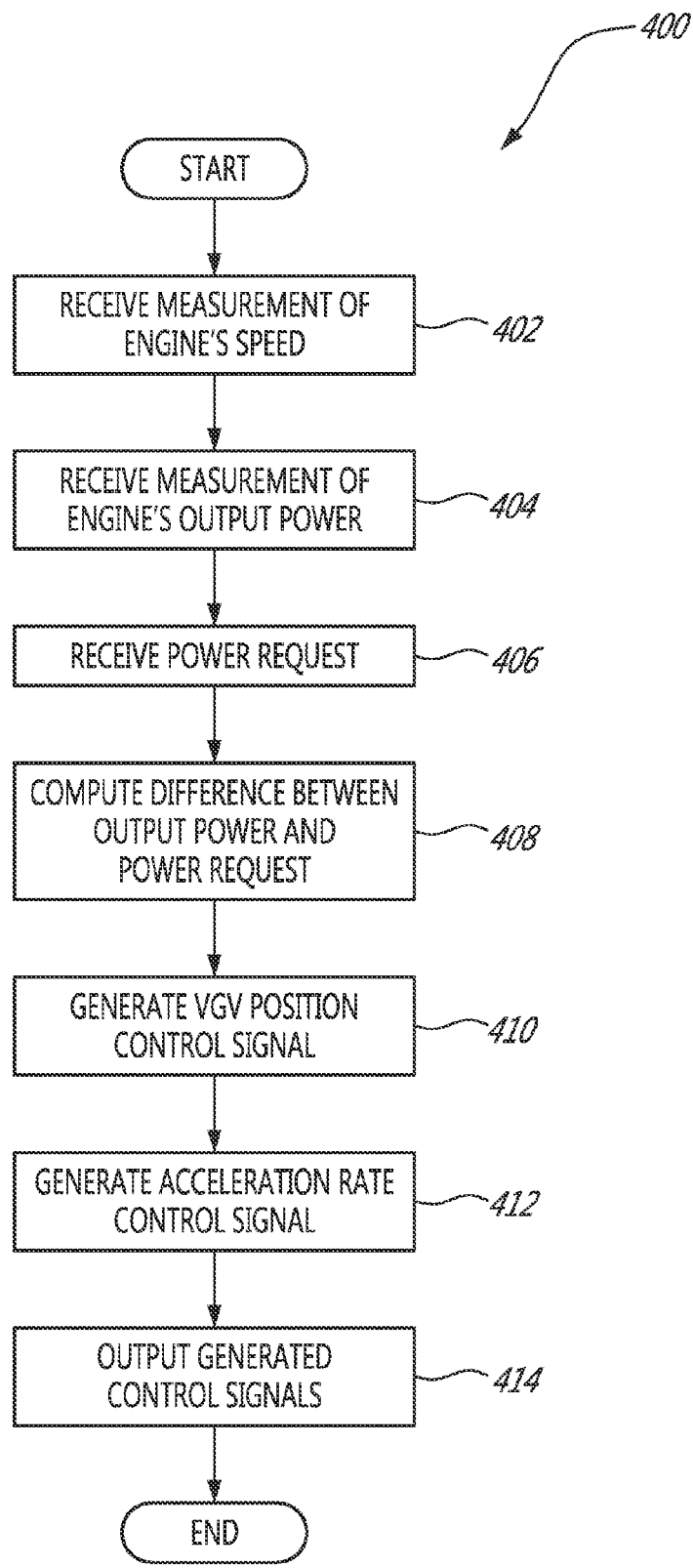
FIG. 4 is a flowchart of a method for controlling the engine of FIG. 1 for transient power response, in accordance with an illustrative embodiment.

Referring now to FIG. 4, a method 400 for controlling the engine (reference 10 in FIG. 1), particularly a variable geometry mechanism (not shown) thereof, to achieve optimized engine transient response will now be described. The method 400 illustratively comprises receiving at step 402 a measurement indicative of the speed of the engine, i.e. the gas generator speed, receiving at step 404 a measurement of the output power of the engine, and receiving at step 406 a power request. It should be understood that the order of steps 402, 404, and 406 may be altered. The next step 408 may then be to compute a difference between the output power and the power request. As discussed herein above, a first control signal for causing adjustment of the position of the VGVs may then be generated at step 410 on the basis of the difference computed at step 408 as well as on the basis of the measurement indicative of the engine speed, as received at step 402. A second control signal for causing adjustment of the engine's acceleration rate may further be generated at step 412. As detailed above, the acceleration control signal may be computed on the basis of the VGV position control signal computed at step 410 and of the measurement indicative of the engine speed, as received at step 402. The method 400 may then output at step 414 the generated control signals to the engine.

Figure 5:
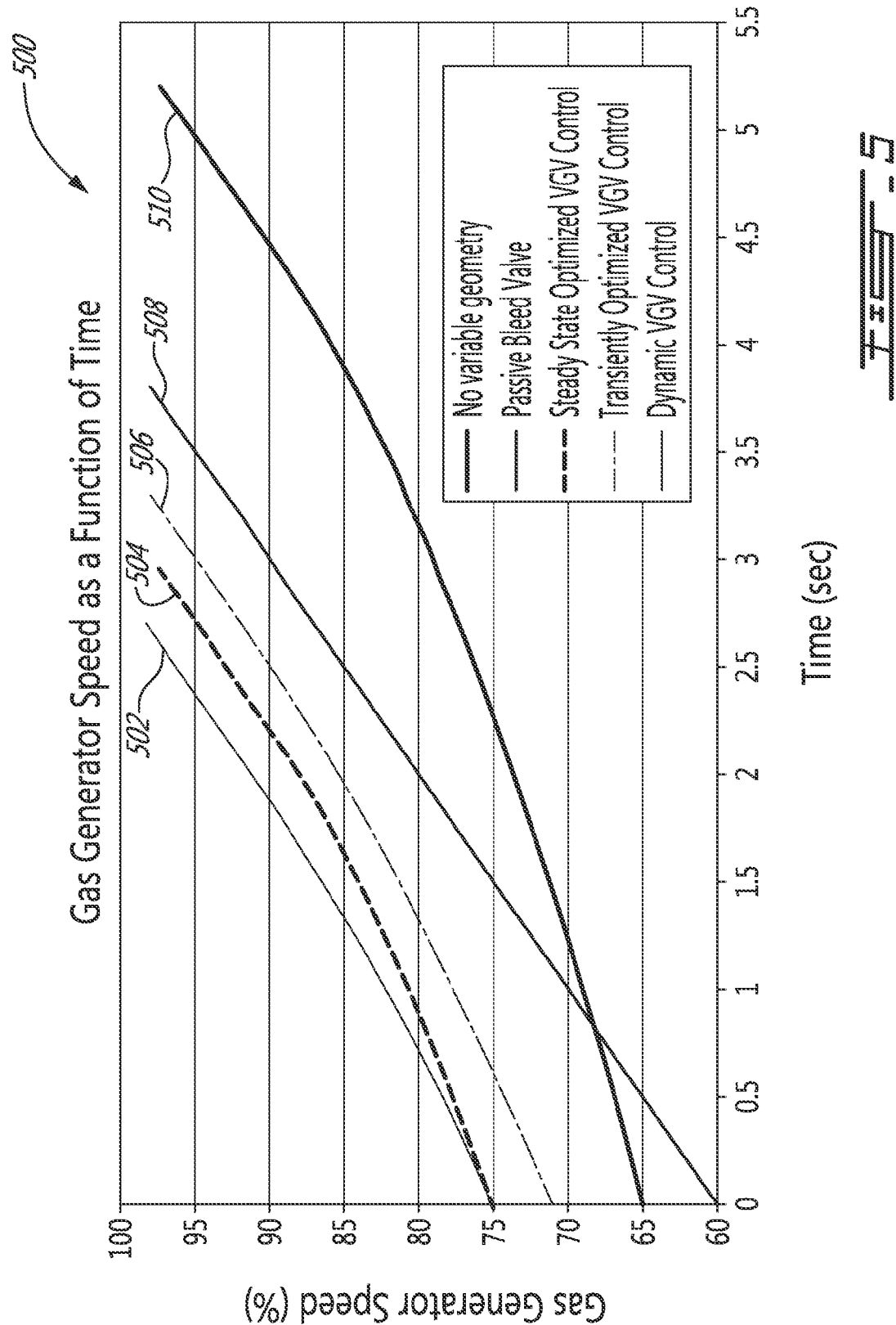
FIG. 5 illustrates a plot of the gas generator speed of an engine as a function of time when various techniques are used to optimize the engine's transient response.

Referring to FIGS. 5 and 6, there is illustrated comparative simulation results for various techniques for optimizing transient engine power response. As shown in the figures, alternative techniques to dynamic VGV control (described herein above with reference to system 100 and method 400) include using no variable geometry mechanism, using a passive bleed valve, using steady state optimized VGV control, and using transiently optimized VGV control. For these different techniques, FIG. 5 shows a plot 500 of the gas generator speed as a function of time while FIG. 6 shows a plot 600 of the engine power as a function of time.

As can be seen in FIG. 5, the plot 502 of the gas generator speed when dynamic VGV control is used shows that the initial engine speed (75%) that can be achieved with dynamic VGV control is maximized compared to other techniques. As discussed above, this optimized initial engine speed can be achieved with the VGVs in a closed setting in the steady state schedule. The plot 502 further shows that a maximized acceleration rate can be achieved using dynamic VGV control. Indeed, plot 504, which illustrates the case where steady state optimized VGV control is used, shows that although a high initial speed (75%) can be achieved with this technique, the acceleration rate is lower than with dynamic VGV control. Plot 506, which illustrates the case where transiently optimized VGV control is used, shows that although a high acceleration rate can be achieved over time with this technique, the initial speed (about 71%) is reduced compared to the dynamic VGV control technique. Plot 508 further illustrates the case where a passive bleed valve is used and shows that, although the acceleration rate is high with this technique, the initial speed (60%) is the lowest. Plot 510 finally illustrates the case with no variable geometry and shows that, although the achieved acceleration is fast, this technique achieves a lower initial speed (65%) than with dynamic VGV control. Thus, it can be seen that, at any given time, the dynamic VGV control technique allows for a higher gas generator speed level.

Plot 602 of FIG. 6, which represents the case with dynamic VGV control, further shows that, through the opening of the VGVs, the dynamic VGV control technique described herein above achieves an immediate power gain. Indeed, it can be seen from plot 602 that the engine power reaches 10% in about 0.1 seconds while the engine power is close to zero at that time for all other techniques shown in plots 604, 606, 608, and 610. As such, is can be seen that the dynamic VGV control enables higher power levels to be reached in less time. Also, at any given time, the power level achieved using dynamic VGV control is greater than that achieved using the other techniques.

The system 100 and method 400 thus allow for maximized engine speed through closing of the VGVs. When increased power levels are requested, a power gain can be promptly obtained by opening of the VGVs. In addition, the engine's acceleration rate can be optimized in accordance with the position of the VGVs, thereby maximizing the engine's speed. In turn, since adjustment of the VGVs influences the speed lines, running line, and surge line of the engine's compressor, spool speed, surge margin, and turbine temperature can be optimized.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A system for controlling an engine, the system comprising:
   a receiving unit adapted to receive a request signal indicative of a difference between a present power level output by the engine and a required power level for the engine; and
   a processing unit adapted to
   generate in response to the request signal a position control signal on the basis of the difference, the position control signal indicative of a first request for adjusting a present position of a variable geometry mechanism of the engine towards a commanded position proportionally to the difference to achieve the required power level,
   generate on the basis of the position control signal an acceleration rate control signal indicative of a second request for adjusting an acceleration rate of the engine in accordance with the commanded position of the variable geometry mechanism, and
   output the position control signal and the acceleration rate control signal to the engine.

2. The system of claim 1, wherein the request signal is received as a first measurement indicative of the present power level output by the engine and a separate signal indicative of the required power level, and wherein the processing unit is adapted to compute the difference between the present power level and the required power level.

3. The system of claim 2, wherein the processing unit is adapted to generate the position control signal for causing the present position of the variable geometry mechanism to be dynamically adjusted between a steady state schedule and a transient schedule.

4. The system of claim 3, wherein the processing unit is adapted to generate the position signal for causing the present position of the variable geometry mechanism to be adjusted towards a closed setting in the steady state schedule, thereby increasing a gas generator speed of the engine.

5. The system of claim 4, wherein the receiving unit is adapted to receive the request indicative of a power deficit in the engine and further wherein the processing unit is adapted to generate the position signal for causing the present position of the variable geometry mechanism to be adjusted towards an open setting in the transient schedule, thereby increasing the present power level towards the required power level for curing the power deficit.

6. The system of claim 5, wherein the receiving unit is further adapted to receive a second measurement indicative of the gas generator speed of the engine and further wherein the processing unit is adapted to generate the acceleration control signal on the basis of the second measurement in addition to the position control signal.

7. The system of claim 6, wherein the processing unit is adapted to increase a maximum allowed acceleration reference of the engine for generating the acceleration rate control signal.

8. The system of claim 7, wherein the processing unit is adapted to generate the position signal for causing adjustment of the position of the variable geometry mechanism comprising at least one of a compressor inlet guide vane, a compressor outlet guide vane, a variable stator vane, and a variable nozzle.

9. The system of claim 2, wherein the receiving unit is adapted to receive the first measurement as a measure of a shaft horse power of the engine and to receive the separate signal as a calculation of a required shaft horse power of the engine.

10. A method for controlling an engine, the method comprising:
- receiving a request signal indicative of a difference between a present power level output by the engine and a required power level for the engine;
- generating in response to the request signal a position control signal on the basis of the difference, the position control signal indicative of a first request for adjusting a present position of a variable geometry mechanism of the engine towards a commanded position proportionally to the difference to achieve the required power level;
- generating on the basis of the position control signal an acceleration rate control signal indicative of a second request for adjusting an acceleration rate of the engine in accordance with the commanded position of the variable geometry mechanism; and
- outputting the position control signal and the acceleration rate control signal to the engine.

11. The method of claim 10, wherein receiving the request signal comprises receiving a first measurement indicative of a present power level output by the engine and a separate signal indicative of the required power level, and computing the difference between the present power level and the required power level.

12. The method of claim 11, wherein generating the position control signal comprises generating the position control signal for causing the present position of the variable geometry mechanism to be dynamically adjusted between a steady state schedule and a transient schedule.

13. The method of claim 12, wherein generating the position control signal comprises generating the position control signal for causing the present position of the variable geometry mechanism to be adjusted towards a closed setting in the steady state schedule, thereby increasing a gas generator speed of the engine.

14. The method of claim 13, wherein receiving the request comprises receiving the request indicative of a power deficit in the engine and further wherein generating the position control signal comprises generating the position control signal for causing the present position of the variable geometry mechanism to be adjusted towards an open setting in the transient schedule, thereby increasing the present power level towards the required power level for curing the power deficit.

15. The method of claim 14, further comprising receiving a second measurement indicative of the gas generator speed of the engine and further wherein generating the acceleration control signal comprises generating the acceleration control signal on the basis of the second measurement in addition to the position control signal.

16. The method of claim 15, wherein generating the acceleration control signal comprises increasing a maximum allowed acceleration reference of the engine.

17. The method of claim 11, wherein receiving the first measurement comprises receiving a measure of a shaft horse power of the engine and receiving the request-separate signal comprises receiving a calculation of a required shaft horse power of the engine.

18. A system for controlling an engine, the system comprising:
- means for receiving a request signal indicative of a difference between a present power level output by the engine and a required power level for the engine;
- means for generating in response to the request signal a position control signal on the basis of the difference, the position control signal indicative of a first request for adjusting a present position of a variable geometry mechanism of the engine towards a commanded position proportionally to the difference to achieve the required power level;
- means for generating on the basis of the position control signal an acceleration rate control signal indicative of a second request for adjusting an acceleration rate of the engine in accordance with the commanded position of the variable geometry mechanism; and
- means for outputting the position control signal and the acceleration rate control signal to the engine.

* * * * *